(12) United States Patent
Cho et al.

(10) Patent No.: US 9,300,948 B2
(45) Date of Patent: Mar. 29, 2016

(54) THREE-DIMENSIONAL IMAGE DISPLAY APPARATUS

(75) Inventors: Jung-Hyun Cho, Suwon-si (KR); Seongmo Hwang, Seongnam-si (KR); Moonjung Baek, Suwon-si (KR); Il Ho Lee, Hwaseong-si (KR); Moongyu Lee, Suwon-si (KR); Jaejin Pyun, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 836 days.

(21) Appl. No.: 13/452,457

(22) Filed: Apr. 20, 2012

(65) Prior Publication Data

US 2013/0141423 A1 Jun. 6, 2013

(30) Foreign Application Priority Data

Dec. 6, 2011 (KR) .................. 10-2011-0129853

(51) Int. Cl.
 *G06T 15/00* (2011.01)
 *H04N 13/04* (2006.01)
 *G02B 27/22* (2006.01)
 *G02B 27/26* (2006.01)

(52) U.S. Cl.
 CPC ........ *H04N 13/0409* (2013.01); *G02B 27/2214* (2013.01); *G02B 27/2264* (2013.01); *H04N 13/042* (2013.01); *H04N 13/0404* (2013.01); *H04N 13/0413* (2013.01); *H04N 13/0456* (2013.01); *H04N 13/0497* (2013.01); *G02B 27/26* (2013.01)

(58) Field of Classification Search
 None
 See application file for complete search history.

(56) References Cited

U.S. PATENT DOCUMENTS

| 5,403,510 | A | * | 4/1995 | Kajiyama | C08L 79/08 252/299.01 |
| 5,969,850 | A | | 10/1999 | Harrold et al. | |
| 6,061,111 | A | * | 5/2000 | Kataoka | G02F 1/133504 349/113 |

(Continued)

FOREIGN PATENT DOCUMENTS

| JP | 2001339057 A | * | 12/2001 |
| KR | 1020060096844 A | | 9/2006 |

OTHER PUBLICATIONS

Lanman et al., "Content-Adaptive Parallax Barriers: Optimizing Dual-Layer 3D Displays using Low-Rank Light Field Factorization," MIT Media Lab-Camera Culture Group, http://cameraculture.media.mit.edu/contentadaptive, Proceedings of ACM SIGGRAPH Asia, 2010 10 pages.

*Primary Examiner* — Christopher S Kelley
*Assistant Examiner* — Kaitlin A Retallick
(74) *Attorney, Agent, or Firm* — Innovation Counsel LLP

(57) ABSTRACT

A 3D image display apparatus includes a light modulator configured to modulate an image light, a difference map generator configured to obtain an absolute value of a difference between a variation value of a left 2D image and a variation value of a right 2D image, an image processor configured to generate 3D image display position information using the absolute value, a light modulator controller configured to partially activate the light modulator in response to the 3D image display position information, an image generator for generating an interlaced image using the left and right 2D images, and an image display device for displaying the interlaced image. The activated area of the light modulator corresponds to an area of the displayed interlaced image, so that the light modulator modulates light provided from the displayed interlaced image, and does not modulate light provided from a remainder of the image.

17 Claims, 17 Drawing Sheets

(56) References Cited

U.S. PATENT DOCUMENTS

| | | | | |
|---|---|---|---|---|
| 2001/0026346 A1* | 10/2001 | Nagasako | ............. | G02F 1/1339 349/153 |
| 2004/0240777 A1* | 12/2004 | Woodgate | ......... | G02B 27/2214 385/16 |
| 2006/0152812 A1* | 7/2006 | Woodgate | ............. | G02B 3/005 359/619 |
| 2007/0035829 A1* | 2/2007 | Woodgate | ............ | G02B 3/0037 359/462 |
| 2007/0047040 A1* | 3/2007 | Ha | ..................... | G02B 27/2278 359/24 |
| 2008/0007661 A1 | 1/2008 | Soh | | |
| 2008/0259157 A1 | 10/2008 | Van Dalfsen | | |
| 2010/0220178 A1* | 9/2010 | Takahashi | ............... | G09G 3/003 348/54 |
| 2010/0245406 A1* | 9/2010 | Redert | ............... | H04N 13/0404 345/690 |
| 2010/0259819 A1* | 10/2010 | Hiddink | ............. | G02B 27/2242 359/463 |

* cited by examiner

THREE-DIMENSIONAL IMAGE DISPLAY APPARATUS

CROSS-REFERENCE TO RELATED APPLICATION

This application relies for priority upon Korean Patent Application No. 10-2011-0129853 filed on Dec. 6, 2011, the contents of which are herein incorporated by reference in their entirety.

BACKGROUND

1. Field of Disclosure

Embodiments of the present invention relate generally to flat panel displays. More specifically, embodiments of the present invention relate to a flat panel three-dimensional (3D) image display apparatus.

2. Description of the Related Art 3D image displays provide a 3D image to a viewer. Current 3D image display apparatuses typically accomplish this by providing a separate left-eye image and right-eye image to the viewer, where the two different images have a binocular disparity, so the viewer perceives an object in 3D. One common way to generate the left-eye image and the right-eye image is through use of a two-dimensional (2D) image and a 2D depth map.

Current 3D image display apparatuses can be classified as being of a stereoscopic type or an auto-stereoscopic type.

The stereoscopic type can be further divided into those employing a polarized glasses scheme and those employing a shutter glasses scheme, and the auto-stereoscopic type can be further divided into those employing a parallax barrier scheme, a lenticular lens scheme, and a polarization active lens scheme. A holographic scheme has also been somewhat recently developed.

SUMMARY

Exemplary embodiments of the present invention provide a 3D image display apparatus capable of reducing power consumption and improving brightness.

According to the exemplary embodiments, a 3D image display apparatus includes a light modulator configured to modulate an image light, a difference map generator for receiving a variation value of a left 2D image and a variation value of a right 2D image and determining an absolute value of a difference between the variation value of the left 2D image and the variation value of the right 2D image. Also included is an image processor configured to generate a 3D image display position information using the absolute value, and to receive the left and right 2D images from the difference map generator, as well as a light modulator controller that partially activates the light modulator in response to the 3D image display position information provided from the image processor, so as to activate an activated area of the light modulator for display of an image according to the 3D image display position information. Further included is an image generator configured to generate an interlaced image using the left and right 2D images and based on the 3D image display position information provided from the image processor, and an image display device configured to display the interlaced image. The activated area of the light modulator corresponds to an area of the displayed interlaced image, so that the light modulator modulates light provided from the displayed interlaced image, and does not modulate light provided from a remainder of the image.

The light modulator includes a first substrate, a second substrate facing the first substrate, and a liquid crystal layer disposed between the first substrate and the second substrate. The first substrate includes a first base substrate and a plurality of first transparent electrodes disposed on the first base substrate and spaced apart from each other to extend substantially in a first direction, and the second substrate includes a second base substrate and a plurality of second transparent electrodes disposed on the second base substrate and spaced apart from each other to extend substantially in a second direction.

The light modulator controller is further configured to generate a parallax barrier in the activated area of the light modulator.

The 3D image display apparatus further includes a sequential driver, and the sequential driver is configured to control the light modulator in response to the 3D image display position information and a scanning of the image display device such that positions of the masks are switched with positions of the slits.

The 3D image display apparatus further includes a dimming controller, wherein the image display device comprises a plurality of blocks, and wherein the dimming controller is configured to control, from the interlaced image and the 2D images, an amount of light emitted from each of the blocks.

The light modulator includes a first substrate, a second substrate facing the first substrate, and a micro-lens array disposed between the first substrate and the second substrate. The micro-lens array includes a substantially transparent frame disposed on the first substrate and comprising a polyimide. The micro-lens array also includes a material disposed on the transparent frame and having a refractive index substantially the same as a refractive index of the liquid crystal when a power supply voltage is not applied to the liquid crystal. The transparent frame has a micro-lens shape at least partially filled with a liquid crystal.

The light modulator includes a birefringence micro-lens array, a lens substrate disposed on the birefringence micro-lens array, and an electric polarization switch disposed on the lens substrate. The birefringence micro-lens array includes a liquid crystal lens and an isotropic polarization film disposed on the liquid crystal lens. The electric polarization switch includes a first substrate, a second substrate facing the first substrate, and a twisted nematic mode liquid crystal disposed between the first substrate and the second substrate.

According to other exemplary embodiments, a 3D image display apparatus includes a light modulator configured to modulate an image light, an image processor that, after receiving a depth map and a 2D image, generates a left 2D image and a right 2D image using the depth map and the 2D image, and generates 3D image display position information corresponding to an area of the depth map. The apparatus also includes a light modulator controller configured to receive the 3D image display position information and to partially activate the light modulator in response to the received 3D image display position information, so as to produce an activated area of the light modulator. Also included is an image generator configured to generate an interlaced image using the left and right 2D images, the interlaced image at least partially based on the 3D image display position information, as well as an image display device for displaying the interlaced image. The activated area of the light modulator modulates image light provided from the image display device, wherein an area of the image display device in which the interlaced image is displayed corresponds to the activated area of the light modulator.

According to the above, the 3D image display apparatus may have improved brightness and reduced power consumption.

BRIEF DESCRIPTION OF THE DRAWINGS

The above and other advantages of embodiments of the present invention will become readily apparent by reference to the following detailed description when considered in conjunction with the accompanying drawings wherein.

DETAILED DESCRIPTION

Hereinafter, the present invention will be explained in detail with reference to the accompanying drawings.

Figure 1:
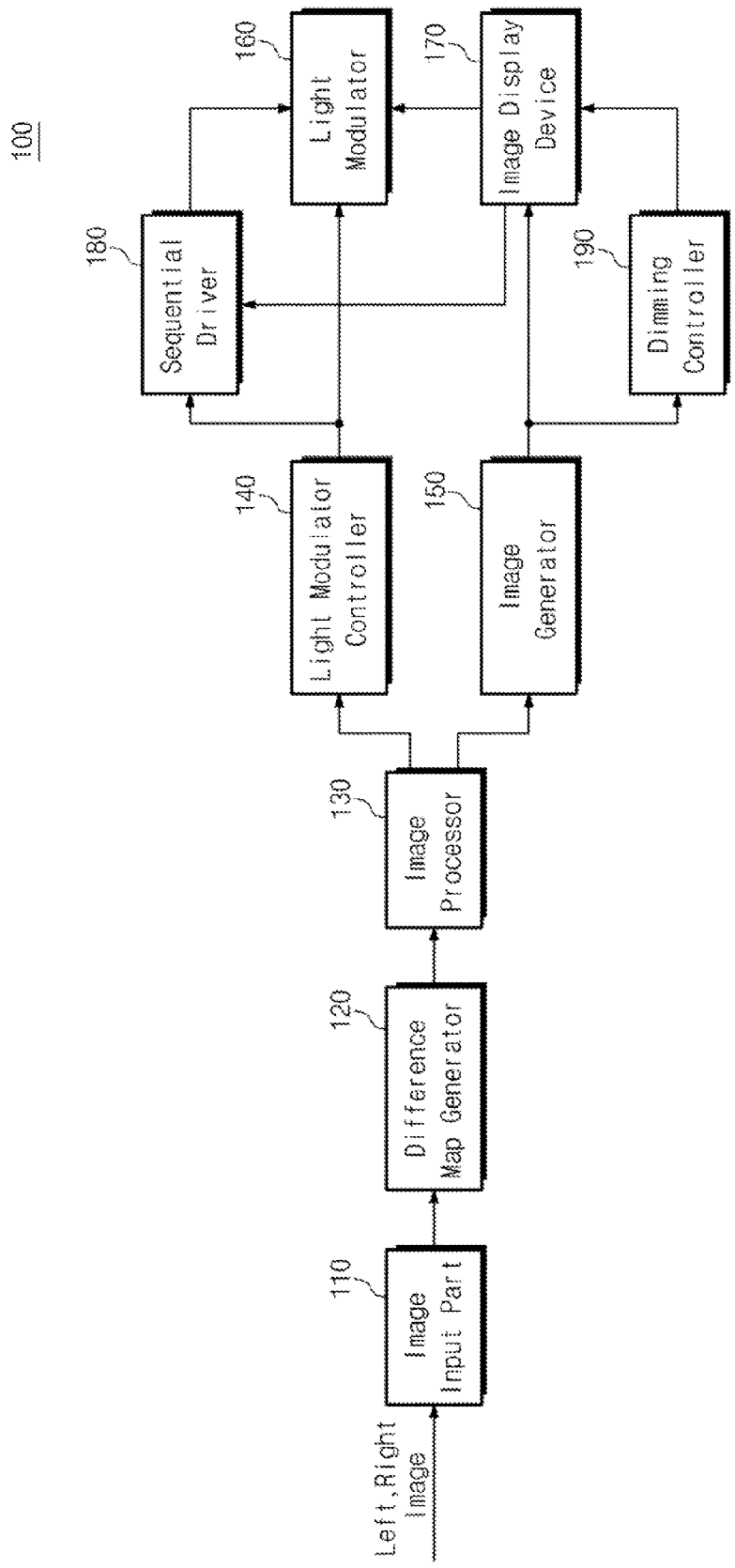
FIG. 1 is a block diagram showing a 3D image display apparatus according to an exemplary embodiment of the present invention.

FIG. 1 is a block diagram showing a 3D image display apparatus according to an exemplary embodiment of the present invention.

Referring to FIG. 1, a 3D image display apparatus 100 includes an image input part 110, a difference map generator 120, an image processor 130, a light modulator controller 140, an image generator 150, a light modulator 160, an image display device 170, a sequential driver 180, and a dimming controller 190. The light modulator 160 is configured to include a liquid crystal barrier device, and the image display device 170 is configured to include a display such as a liquid crystal display or an organic light emitting display.

The image input part 110 receives left and right images from an external device (not shown) and provides these left and right images to the difference map generator 120. The left image includes a left 2D image and a variation value for the left 2D image, and the right image includes a right 2D image and a variation value for the right 2D image. Since the images are displayed through a plurality of pixels, the images may be configured or manipulated for display by the particular combination of pixels. Accordingly, the variation values include pixel variation values for corresponding pixels.

The difference map generator 120 obtains an absolute value of a difference between the variation value of the left 2D image and the variation value of the right 2D image, which are provided from the image input part 110. For instance, the difference map generator 120 calculates the absolute value of the result obtained by subtracting the variation value of the right 2D image from the variation value of the left 2D image, and the absolute value of the result obtained by subtracting the variation value of the left 2D image from the variation value of the right 2D image.

Images for which the difference between the variation values of the left and right 2D images is zero (0) are displayed in 2D, while images for which the difference between the variation values of the left and right 2D images is not zero (0) are displayed in 3D. For instance, in the case that a rectangular 3D object is displayed on a blue background, which is a 2D image, the absolute value of the difference between the variation values of the left and right 2D images becomes zero with respect to the background. However, the absolute value of the difference between the variation values of the left and right 2D images is nonzero with respect to the rectangular 3D object.

The difference map generator 120 provides the left 2D image, the right 2D image, and the absolute value of the difference between the variation value of the left 2D image and the variation value of the right 2D image to the image processor 130.

The image processor 130 generates 3D image display position information using the absolute value of the difference between the variation values of the left and right 2D images. In detail, the image processor 130 generates the 3D image display position information using the nonzero absolute values of the difference between the variation values of the left and right 2D images. The 3D image display position information includes position information for an area of the light modulator 160, which corresponds to an area in which the 3D image is displayed. The 3D image display position information is provided to the light modulator controller 140 and the image processor 150. In addition, the image processor 130 provides the left 2D image and the right 2D image from the difference map generator 120 to the image generator 150.

The light modulator controller 140 partially activates the light modulator 160 in response to the 3D image display position information provided from the image processor 130. The area of the light modulator 160 which is activated by the light modulator controller 140 modulates an image light provided from the image display device 170, in order to provide the 3D image to an observer.

Such operation is performed by generating a parallax barrier in the activated area of the light modulator 160, since the light modulator 160 is configured to include a barrier such as a liquid crystal barrier device. In addition, the light modulator controller 140 provides the 3D image display position information to the sequential driver 180. In the present exemplary embodiment, the 3D image display position information is generated using the nonzero absolute value of the difference between the variation values of the left and right 2D images, and thus the activated area of the light modulator 160 corresponds to the area in which the 3D image is displayed. The area prepared to display the 3D image may be defined as an area of the image display device 170 in which an interlaced image is displayed to provide the 3D image to the observer.

Accordingly, the area for the parallax barrier generated in the activated area of the light modulator 160 corresponds to the area in which the 3D image is displayed.

Based on the 3D image display position information provided from the image processor 130, and using the left 2D image and the right 2D image, the image generator 150 generates the interlaced image that is to be displayed in the area of the image display device 170 which corresponds to the activated area of the light modulator 160. The parallax barrier is generated in the activated area of the light modulator 160. Thus, the image generator 150 receives information about the area of the image display device 170 from the 3D image display position information, which corresponds to the area in which the parallax barrier is generated.

The interlaced image includes left and right images to be alternately displayed through the image display device 170. The interlaced image is provided to the image display device 170. The left and right images displayed on the image display device 170 are respectively provided to left and right eyes of the observer through slits of the parallax barrier shown in FIGS. 3 and 4. In addition, the image generator 150 generates the 2D image using the left and right 2D images, where this 2D image is displayed in the areas of the image display device 170 besides the area in which the interlaced 3D image is displayed. The image generator 150 provides the generated 2D image to the image display device 170.

The image display device 170 displays the 2D image and the interlaced 3D image from the image generator 150. The area for the interlaced image corresponds to the area for the parallax barrier generated in the activated area of the light modulator 160. The interlaced image displayed through the image display device 170 is thus provided to the observer as a 3D image through the parallax barrier displayed in the light modulator 160.

The images generated by the image generator 150 are also provided to the dimming controller 190. In the case that the image display device 170 is a liquid crystal display, the dimming controller 190 divides a backlight unit and a liquid crystal panel into a plurality of blocks, analyzes data in each block, determines local dimming values, and controls the various blocks of the backlight according to these dimming values. That is, the dimming controller 190 divides the image display device 170 into the blocks and controls an amount of light emitted from each block, thereby improving a contrast ratio of the images.

Although not shown in FIG. 1, when the image display device 170 is an organic light emitting display, the dimming controller 190 is not needed since the organic light emitting display may control brightness in each pixel. In the case that the interlaced image is displayed on the organic light emitting display, the brightness of the organic light emitting display is reduced due to the parallax barrier. However, the organic light emitting display controls the brightness in each pixel to adjust the brightness in areas in which the interlaced image is displayed, thereby preventing the overall brightness from being reduced. In other words, the organic light emitting display applies a higher voltage to the pixels in the display panel for the 3D interlaced image than that applied to the pixels in the display panel for the 2D image. Thus, the organic light emitting display may increase the brightness in the pixels in which the interlaced image is displayed so as to prevent the overall brightness from being reduced due to the parallax barrier.

Responsive to a scanning synchronization signal from the image display device 170, the sequential driver 180 controls the light modulator 160 with a sequential barrier method, using the 3D image display position information provided from the light modulator controller 140. Since the light modulator 160 is controlled by a sequential barrier method, a resolution of the image is improved. The operation of the sequential barrier method performed by the sequential driver 180 will be described in detail with reference to FIGS. 4A and 4B, below.

The above-mentioned 3D image display position information is generated with the nonzero absolute value of the difference between the variation values of the left and right 2D images. However, the 3D image display position information may alternatively be generated only when the absolute value of the difference is greater than a predetermined reference value. For instance, as the absolute value of the difference increases, the 3D effect becomes enhanced, while conversely, the 3D effect becomes reduced as the absolute value of the difference decreases. Accordingly, when the absolute value of the difference is equal to or smaller than some reference value, the image processor 130 can be set so as not to generate the 3D image display position information so that the image, in which the 3D effect is relatively small, is displayed in 2D. In this case, the image processor 130 generates the 3D image display position information only when the absolute value of the difference is greater than some predetermined reference value. This reference value can be any suitable value, and the invention contemplates any such value.

Subsequently, the 3D image display apparatus 100 generates the parallax barrier and the interlaced image only in the area in which the 3D image is displayed. Thus, only light from the interlaced image is modulated, while light from the surrounding 2D image is not modulated. In this manner, the area of the parallax barrier is reduced and the size of the left and right images of the interlaced image is reduced as compared to when the parallax barrier and the interlaced image are formed over the whole display screen. As described above, since the area for the parallax barrier is reduced, the brightness is lowered to a less significant degree then when the parallax barrier is formed over the whole display screen. In other words, the brightness is enhanced since the area of the parallax barrier is reduced. In addition, since the area for the parallax barrier and the size of the left and right images of the interlaced image are reduced, power consumption in the 3D image display apparatus 100 is reduced and the signal processing for the 3D image display apparatus 100 is simplified.

Figure 2:
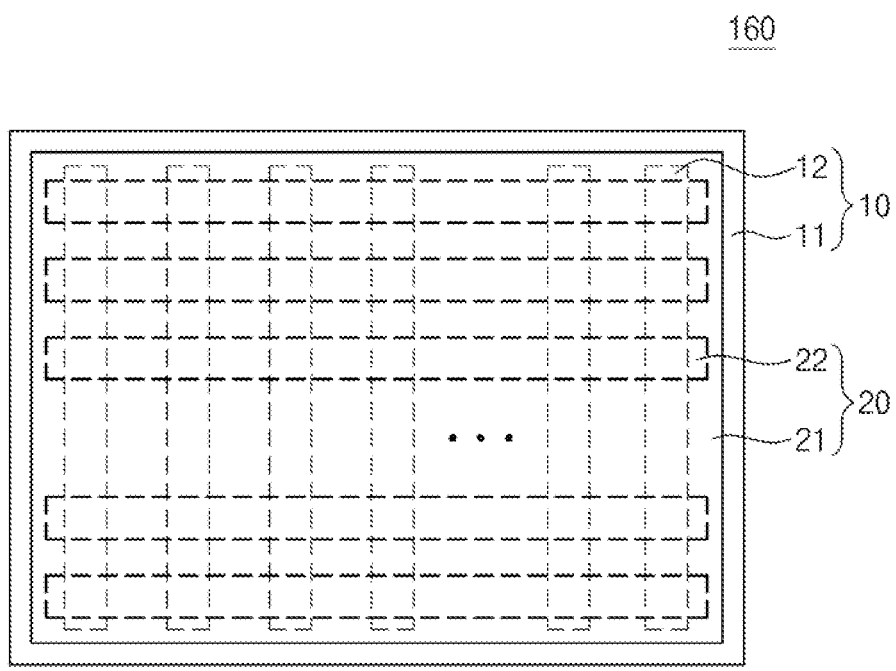
FIG. 2 is a plan view of a light modulator shown in FIG. 1.

FIG. 2 is a plan view showing further details of light modulator 160 of FIG. 1. In the light modulator 160 of FIG. 2, a liquid crystal barrier device is used. The light modulator 160 may include a passive matrix panel which does not have a color filter.

Referring to FIG. 2, the light modulator 160 includes a first substrate 10 and a second substrate 20 facing the first substrate 10. Although not shown in FIG. 2, the liquid crystal layer is disposed between the first substrate 10 and the second substrate 20.

The first substrate 10 includes a first base substrate 11 and a plurality of first transparent electrodes 12, which are disposed on the first base substrate 11, spaced apart from each other, and which extend generally in a vertical direction in the view shown. The second substrate 20 includes a second base substrate 21 and a plurality of second transparent electrodes 22, which are disposed on a lower portion of the second base substrate 21, spaced apart from each other, and which extend generally in a horizontal direction.

The first transparent electrodes 12 and the second transparent electrodes 22 are arranged in a matrix form, so that the first transparent electrodes 12 cross the second transparent electrodes 22. Accordingly, the power supply voltage may be applied to the first and second transparent electrodes 12 and 22 such that the first and second transparent electrodes 12 and 22 operate individual unit pixels. For instance, the light modulator controller 140 controls the light modulator 160 in known fashion to allow the power supply voltage to be applied to those first transparent electrodes 12 and second transparent electrodes 22 which correspond to the activation area of the light modulator 160, thereby partially activating the light modulator 160. Thus, the parallax barrier may be generated only in the area of the light modulator 160 activated by the 3D image display position information.

Figure 3A:
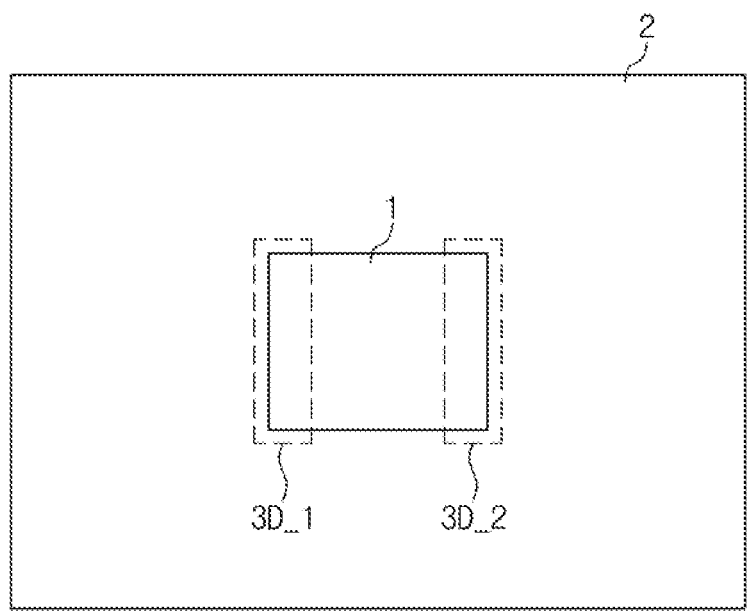
FIG. 3A is a view showing an image displayed on a screen.

FIG. 3A is a view showing an image displayed on a screen.

Referring to FIG. 3A, the image provided to the observer is configured to include a background 2 and a rectangular image 1 displayed in 3D. When the 3D effect occurs in the left area 3D_1 and the right area 3D_2 of the rectangular image 1, the parallax barrier is generated in the area of the light modulator 160 which correspond to the left area 3D_1 and the right area 3D_2. In addition, the interlaced 3D image is displayed in the area of the image display device 170 which corresponds to the left area 3D_1 and the right area 3D_2.

Figure 3B:
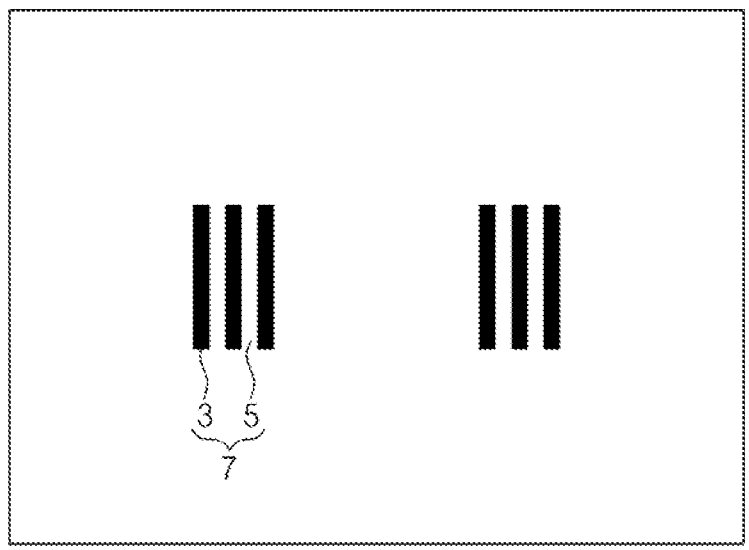
FIG. 3B is a view showing a parallax barrier generated in an area of a light modulator corresponding to a left area and a right area shown in FIG. 3A.

FIG. 3B is a view showing the parallax barrier generated in the area of the light modulator 160 corresponding to the left area and the right area shown in FIG. 3A.

Referring to FIG. 3B, the power supply voltage is applied to the first and second transparent electrodes 12 and 22 of the light modulator 160 shown in FIG. 2, so as to generate the parallax barrier in the area of the light modulator 160 corresponding to the left area 3D_1 and the right area 3D_2. The parallax barrier 7 that is generated in the area of the light modulator 160 corresponding to the left area 3D_1 and the right area 3D_2 includes a plurality of masks 3 and a plurality of slits 5. The masks 3 are extended in a vertical direction and arranged in a generally horizontal direction, and the slits 5 are disposed between the masks 3. The masks 3 are represented in black.

Figure 3C:
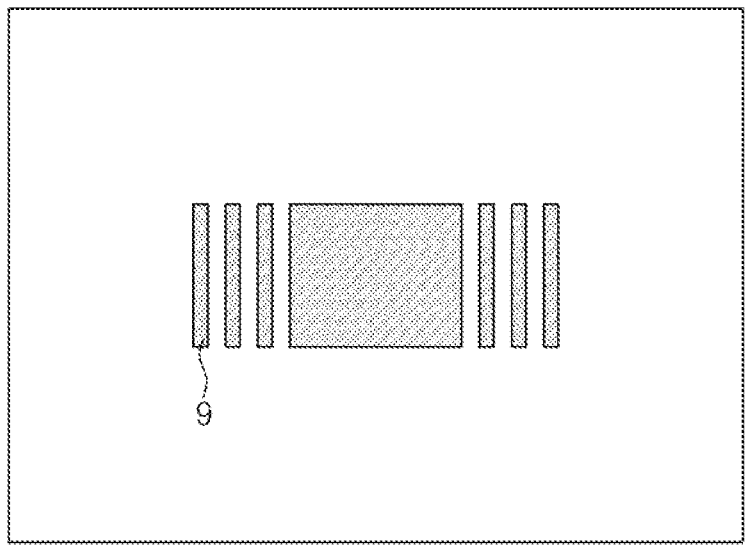
FIG. 3C is a view showing an interlaced image displayed in an area of an image display device corresponding to the left area and the right area shown in FIG. 3A.

FIG. 3C is a view showing the interlaced image displayed in the area of the image display device corresponding to the left area and the right area shown in FIG. 3A.

Referring to FIG. 3C, the image generator 150 generates the interlaced image 9 displayed in the area of the image display device 170 corresponding to the left area 3D_1 and the right area 3D_2. The generated interlaced image 9 is provided to the image display device 170. The image display device 170 displays the interlaced image 9 provided from the image generator 150.

Figure 4A:
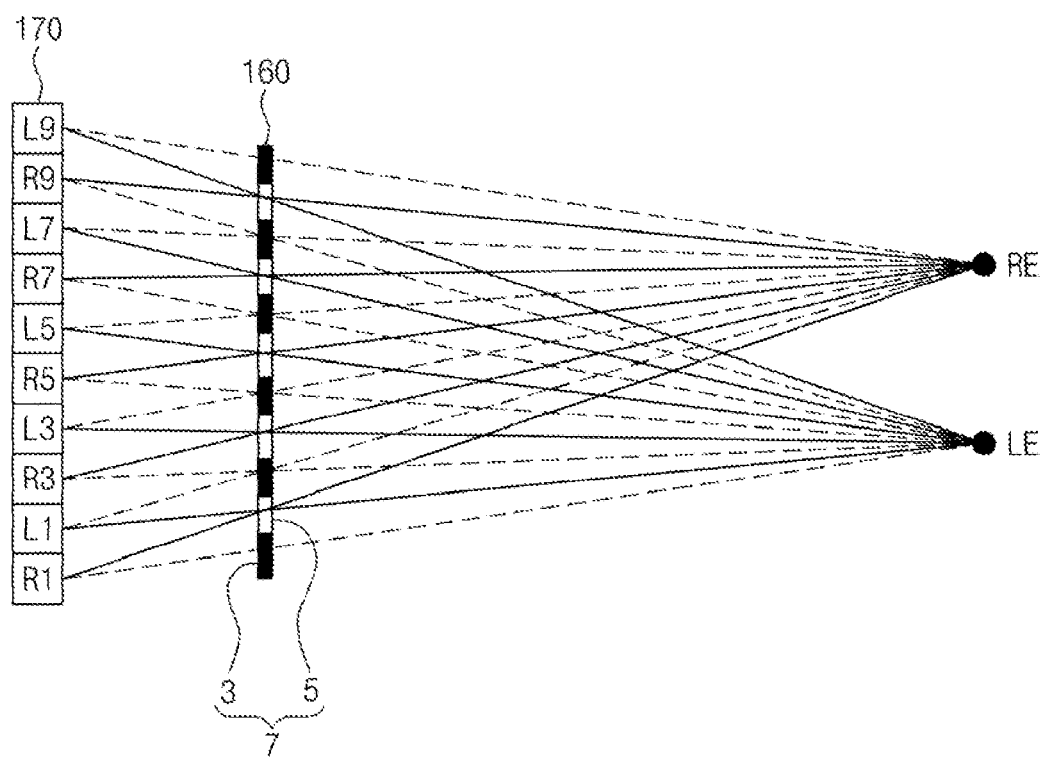
FIGS. 4A and 4B are views showing a sequential barrier method performed by a sequential driver shown in FIG. 1.
Figure 4B:
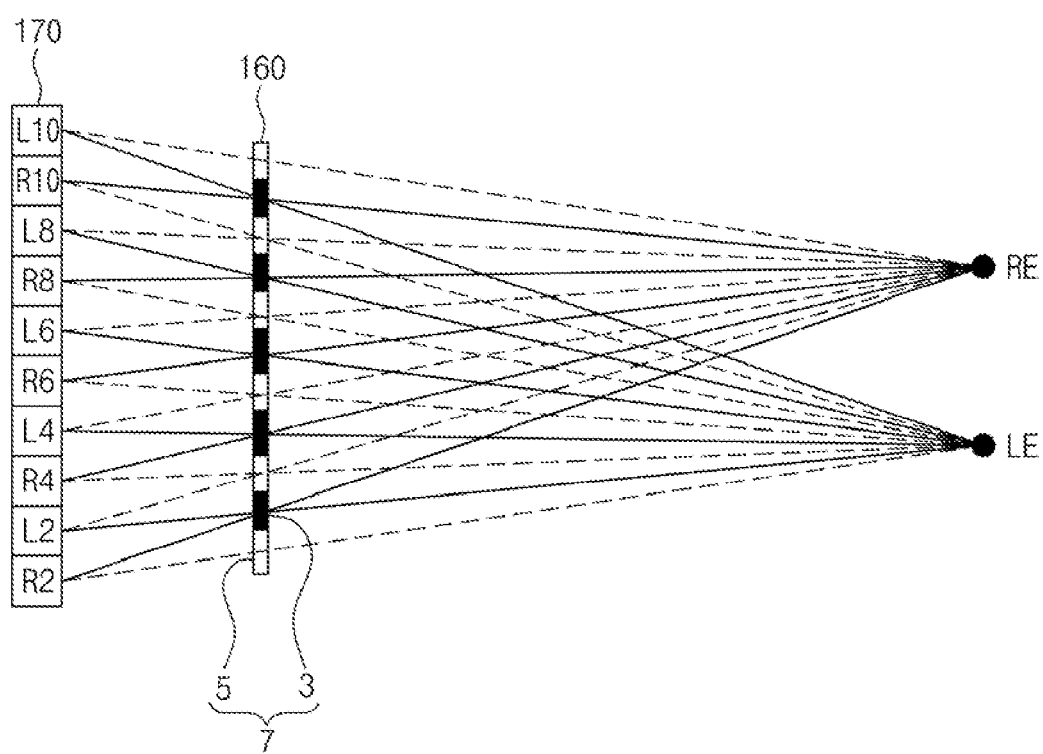

FIGS. 4A and 4B are views showing the sequential barrier method performed by the sequential driver shown in FIG. 1. For convenience in explanation, FIGS. 4A and 4B show only the area of the image display device 170 in which the interlaced image is displayed, and the area of the light modulator 160 in which the parallax barrier is generated.

Referring to FIG. 4A, the interlaced image includes left-eye image information Ln (here, L1-L9) and right-eye image information Rn (here, R1-R9), and the parallax barrier includes masks 3 and slits 5 disposed between the masks 3. The images are separated from each other by passing through the slits 5 of the parallax barrier of the light modulator 160.

In the image display device 170, the left-eye image information Ln and the right-eye image information Rn are arranged in alternating manner. A pixel column having the left-eye image information Ln and a pixel column having the right-eye image information Rn are grouped into one set, and the left and right pixel columns are separated into images with different viewpoints with reference to the slits 5, thereby realizing the 3D image. For instance, odd-numbered left-eye image information L1, L3, L5, L7, and L9 of the left-eye image information Ln and odd-numbered right-eye image information R1, R3, R5, R7, and R9 of the right-eye image information Rn are grouped into one set and input to the image display device 170. The image configured to include the odd-numbered left-eye images and the odd-numbered right-eye images is referred to as a first field image.

As described above, since the images are viewed through the slits 5 and blocked by the masks 3, the odd-numbered left-eye images are provided to the left eye of the observer and the odd-numbered right-eye images are provided to the right eye of the observer. However, when only the odd-numbered images in the odd-numbered columns are displayed, the resolution of the image may be degraded. Accordingly, a sequential barrier method is used. As described in FIG. 2, the parallax barrier may be actively controlled by the structure of the transparent electrode of the light modulator 160.

Referring to FIG. 4B, the sequential driver 180 actively controls the shape of the parallax barrier 7 in synchronization with the scanning of the image display device 170, using the 3D image display position information. That is, the sequential driver 180 controls the light modulator 160 such that the position of the slits 5 is electrically switched with the position of the masks 3. When compared with the parallax barrier 7 shown in FIG. 4A, the parallax barrier 7 shown in FIG. 4B is switched and the positions of the slits 5 and masks 3 are shifted. Then, even-numbered left-eye image information L2, L4, L6, L8, and L10 corresponding to even-numbered columns and even-numbered right-eye image information R2, R4, R6, R8, and R10 corresponding to even-numbered columns are input to the image display device 170. The even-numbered left-eye images are provided to the left eye of the observer and the even-numbered right-eye images are provided to the right eye of the observer. The image configured to include the even-numbered left-eye images and the even-numbered right-eye images is referred to as a second field image.

Consequently, the first field image in the odd-numbered columns and the second field image in the even-numbered columns are displayed in time sequence, thereby improving the resolution of the 3D image. That is, the first field image is displayed with the mask 3 and slits 5 positioned as in FIG. 4A, and then the second field image is displayed with the mask 3 and slits 5 shifted so as to be positioned as in FIG. 4B. In this manner, the left and right eyes of the observer receive both the first field image and the second field image, rather than just one or the other, preventing image degradation.

Figure 5:
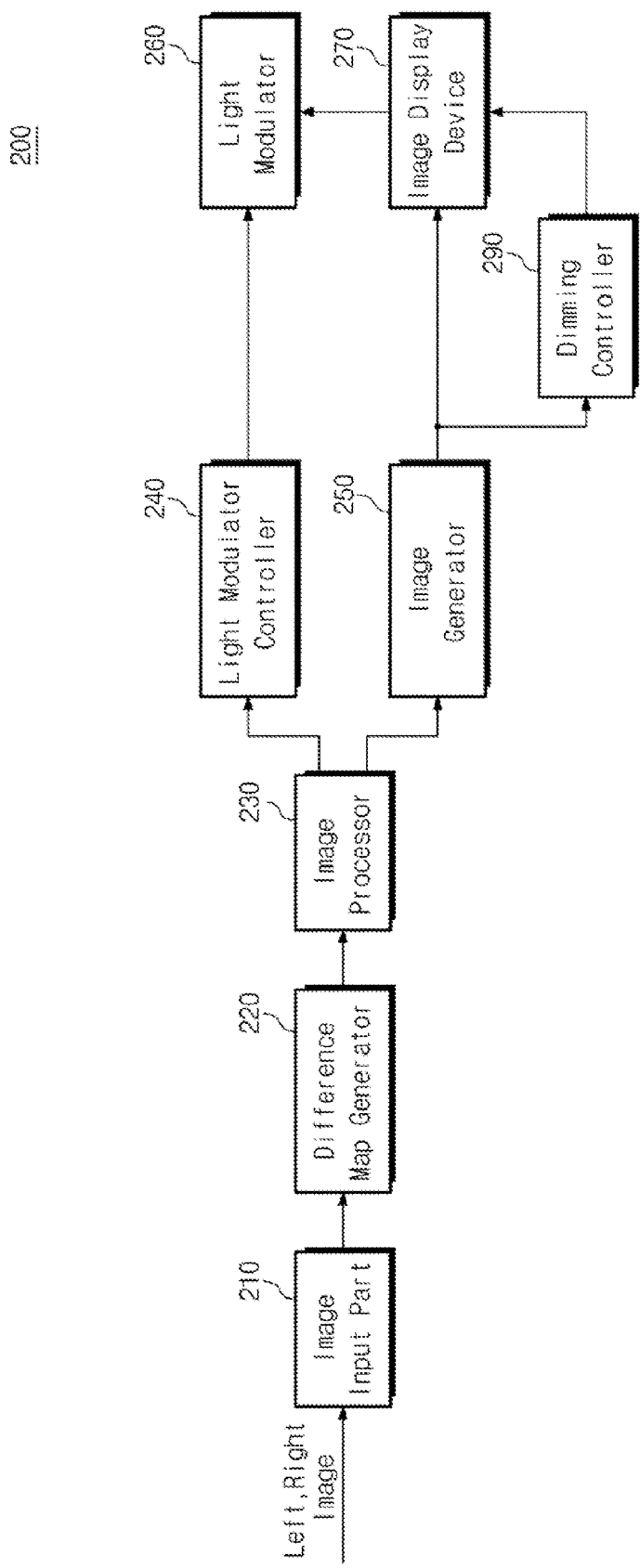
FIG. 5 is a block diagram showing a 3D image display apparatus according to an exemplary embodiment of the present invention.

FIG. 5 is a block diagram showing a 3D image display apparatus according to an exemplary embodiment of the present invention. In FIG. 5, the same or corresponding reference numerals denote the same or corresponding elements in FIG. 1, and thus detailed descriptions of the same elements will be omitted. For example, image input part 210, difference map generator 220, image generator 250, and dimming controller 290 correspond to image input part 110, difference map generator 120, image generator 150, and dimming controller 190 respectively, and function similarly. In the present exemplary embodiment, a light modulator 260 is configured to include an active lenticular lens array or a polarization active lens array, and not to include a sequential driver.

Referring to FIG. 5, the light modulator 260 may include either an active lenticular lens array or a polarization active lens array. The active lenticular lens array will be described in further detail with reference to FIG. 6, and the polarization active lens array will be described in more detail with reference to FIG. 7.

The 3D image display position information generated by an image processor 230 is provided to a light modulator controller 240. The light modulator controller 240 partially activates the light modulator 260 in response to the 3D image display position information provided from the image processor 230.

Since the light modulator 260 is configured to include a lens array, a lens area corresponding to the activated area of the light modulator 260 is supplied with a power supply voltage and operated. That is, the lens area of the light modulator 260, which corresponds to the area in which the 3D image is displayed, is operated in response to the power supply voltage, and thus no parallax barrier need be present. The light in the lens area is refracted or modulated when the power supply voltage is applied, thereby providing the 3D image to the observer due to the refracted light.

Consequently, the power consumption in the 3D image display apparatus 200 may be reduced, since the 3D image display apparatus 200 drives only the lens area corresponding to the area in which the 3D image is displayed.

Figure 6A:
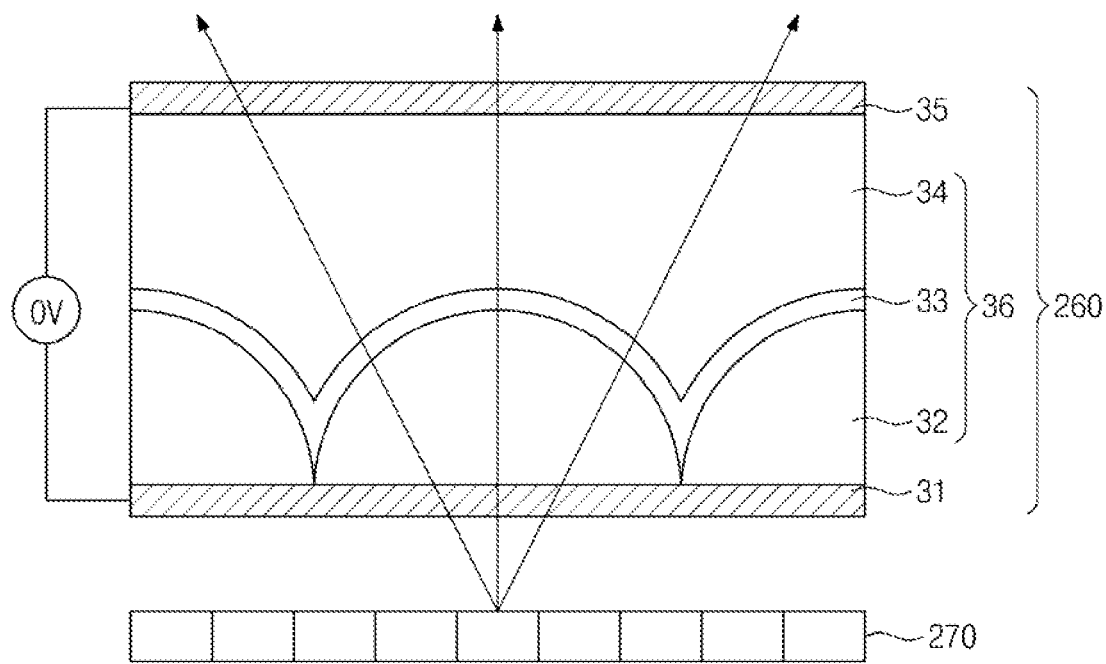
FIGS. 6A and 6B are cross-sectional views showing an active lenticular lens array according to an exemplary embodiment of a light modulator shown in FIG. 5.
Figure 6B:
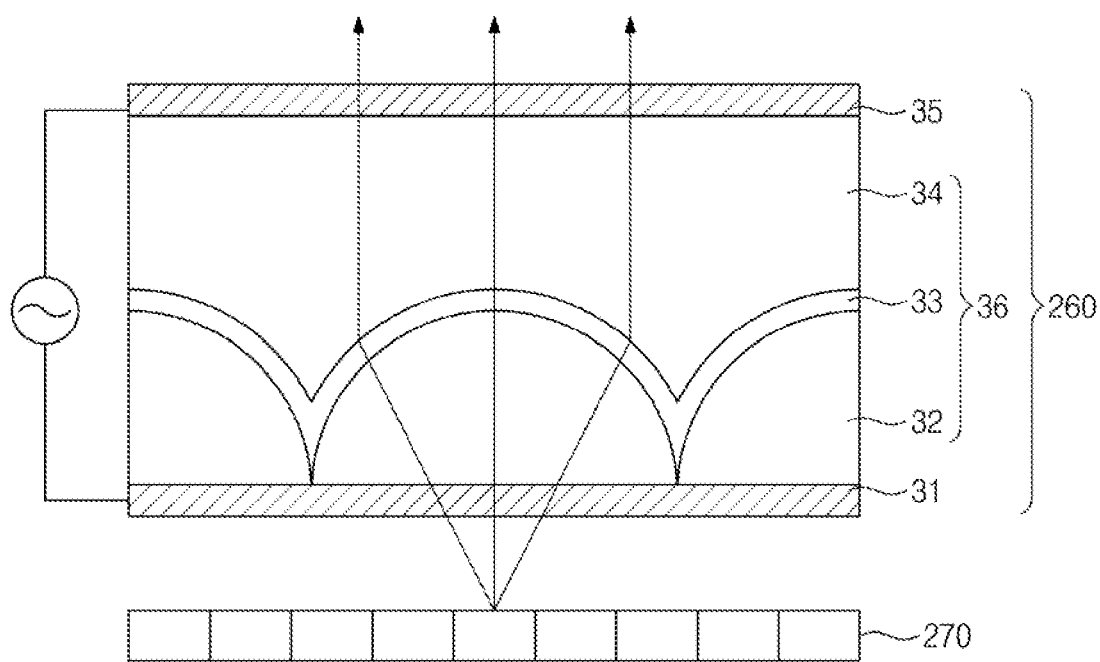

FIGS. 6A and 6B are cross-sectional views showing an active lenticular lens array for use in an exemplary embodiment of a light modulator 260 such as that shown in FIG. 5. In detail, FIG. 6A shows light pathways through the active lenticular lens array when no power supply voltage is applied to the active lenticular lens array, and FIG. 6B shows light pathways through the active lenticular lens array when the power supply voltage is applied to the active lenticular lens array.

Referring to FIGS. 6A and 6B, the active lenticular lens array 260 includes a first substrate 31, a second substrate 35 facing the first substrate 31, and a micro-lens array 36 disposed between the first substrate 31 and the second substrate 35. The micro-lens array 36 is disposed on the first substrate 31 and includes a substantially transparent frame 33 formed of polyimide and a replica 34 disposed on the transparent frame 33. A liquid crystal 32 is filled in a space defined by (i.e. between) the first substrate 31 and the transparent frame 33, and the replica 34 is formed of a material having the same or substantially the same refractive index as that of the liquid crystal 32 when no power supply voltage is applied.

The first substrate 31 and the second substrate 35 have substantially the same structures as those of the first substrate 10 and the second substrate 20 shown in FIG. 2, respectively. That is, each of the first and second substrates 31 and 35 includes a plurality of transparent electrodes. The transparent electrodes on the first substrate 31 are spaced apart from each other and arranged in a vertical direction, and the transparent electrodes on the second substrate 35 are spaced apart from each other and arranged in a horizontal direction. Accordingly, the power supply voltage may be applied to the transparent electrodes of the first and second substrates 31 and 35 such that the transparent electrodes 12 and 22 operate a unit pixel.

The lens area of the active lenticular lens array 260, which is activated by the 3D image display position information, is powered by the power supply voltage. The light in the lens area operated in response to the power supply voltage is refracted or modulated, thereby providing the 3D image to the observer due to the refracted light.

When the power supply voltage is not applied to the transparent electrodes, the image light from the image display device 270 passes through the active lenticular lens array 260 without refraction or change of direction, since the liquid crystal 32 and the replica 34 have the same refractive index. This case is shown in FIG. 6A. Thus, a 2D image is provided to the observer.

When the power supply voltage is applied to the transparent electrodes, the image light from the image display device 270 is refracted as it passes through the active lenticular lens array 260, since the liquid crystal 32 now has a refractive index different from that of the replica 34. This case is shown in FIG. 6B. Thus, a 3D image is provided to the observer.

Figure 7A:
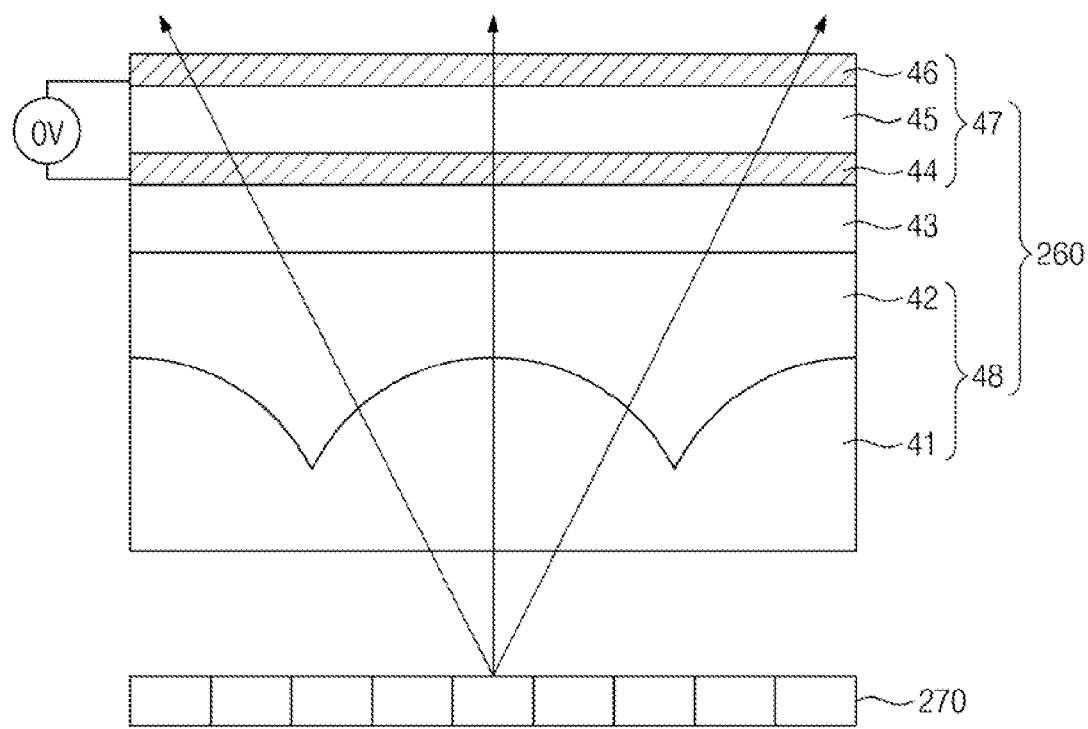
FIGS. 7A and 7B are cross-sectional views showing a polarization active lens array according to an exemplary embodiment of a light modulator shown in FIG. 5.
Figure 7B:
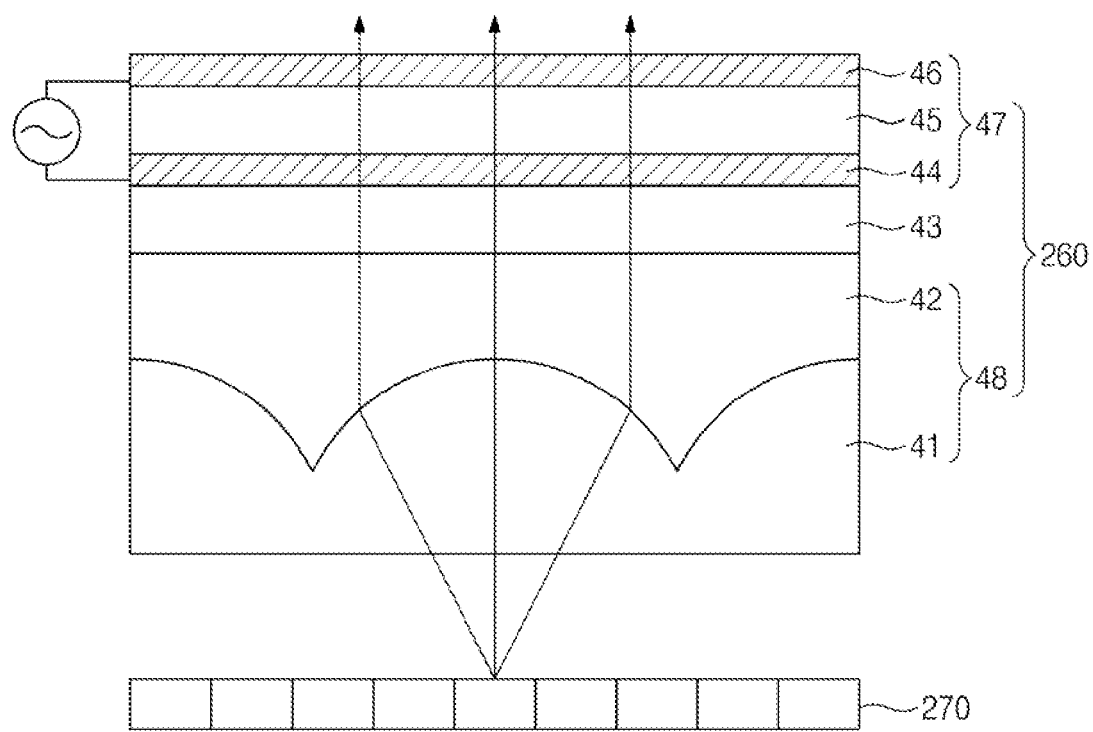

FIGS. 7A and 7B are cross-sectional views showing a polarization active lens array according to a further exemplary embodiment of a light modulator 260 such as that shown in FIG. 5. In detail, FIG. 7A shows light pathways through the polarization active lens array when no power supply voltage is applied to the polarization active lens array, and FIG. 7B shows a light traveling direction in the polarization active lens array when a power supply voltage is applied to the polarization active lens array.

Referring to FIGS. 7A and 7B, the polarization active lens array 260 includes a birefringence micro-lens array 48, a lens substrate 43 disposed on the birefringence micro-lens array 48, and an electric polarization switch 47 disposed on the lens substrate 43.

The birefringence micro-lens array 48 includes a liquid crystal lens 41 (hereinafter, referred to as a birefringence material) and an isotropic polarization film 42 disposed on the birefringence material 42.

The electric polarization switch 47 includes a first substrate 44, a second substrate 46 facing the first substrate 44, and a twisted nematic mode liquid crystal 45 disposed between the first substrate 44 and the second substrate 46.

The first substrate 44 and the second substrate 46 have substantially the same structure as those of the first substrate 10 and the second substrate 20 shown in FIG. 2. That is, each of the first substrate 44 and the second substrate 46 includes a plurality of transparent electrodes, where the transparent electrodes on the first substrate 44 are spaced apart from each other and arranged in a vertical direction, and the transparent electrodes on the second substrate 46 are spaced apart from each other and arranged in a horizontal direction. Accordingly, the transparent electrodes may be operated to activate individual unit pixels.

The lens area of the polarization active lens array 260, which is activated by the 3D image display position information, is operated via application of the power supply voltage, similar to the previous embodiment. The light in the lens area operated in response to the power supply voltage is refracted or modified, thereby providing a 3D image to the observer.

As shown in FIG. 7A, when the power supply voltage is not applied to the transparent electrodes, the electric polarization switch 47 is configured to transmit light polarized in a direction substantially parallel to an ordinary axis of the birefringence material 41 of the birefringence micro-lens array 48. The ordinary refractive index of the birefringence material 41 is substantially the same as the refractive index of the isotropic polarization film 42. Thus, the polarization active lens array 260 does not have any substantial optical effect on light passing through, and the direction of image light from the image display device 270 is substantially unchanged. Accordingly, a 2D image is provided to the observer.

As shown in FIG. 7B, when the power supply voltage is applied to the transparent electrodes, the electric polarization switch 47 is configured to transmit light polarized in a direction substantially parallel to an extra-ordinary axis of the birefringence material 41 of the birefringence micro-lens array 48. The extra-ordinary refractive index of the birefringence material 41 is different from the refractive index of the isotropic polarization film 42. Thus, the polarization active lens array 260 does have an optical effect, and the direction of image light from the image display device 270 is changed. That is, since the image light from the image display device 270 is refracted or modulated while passing through the polarization active lens array 260, a 3D image is provided to the observer.

Figure 8:
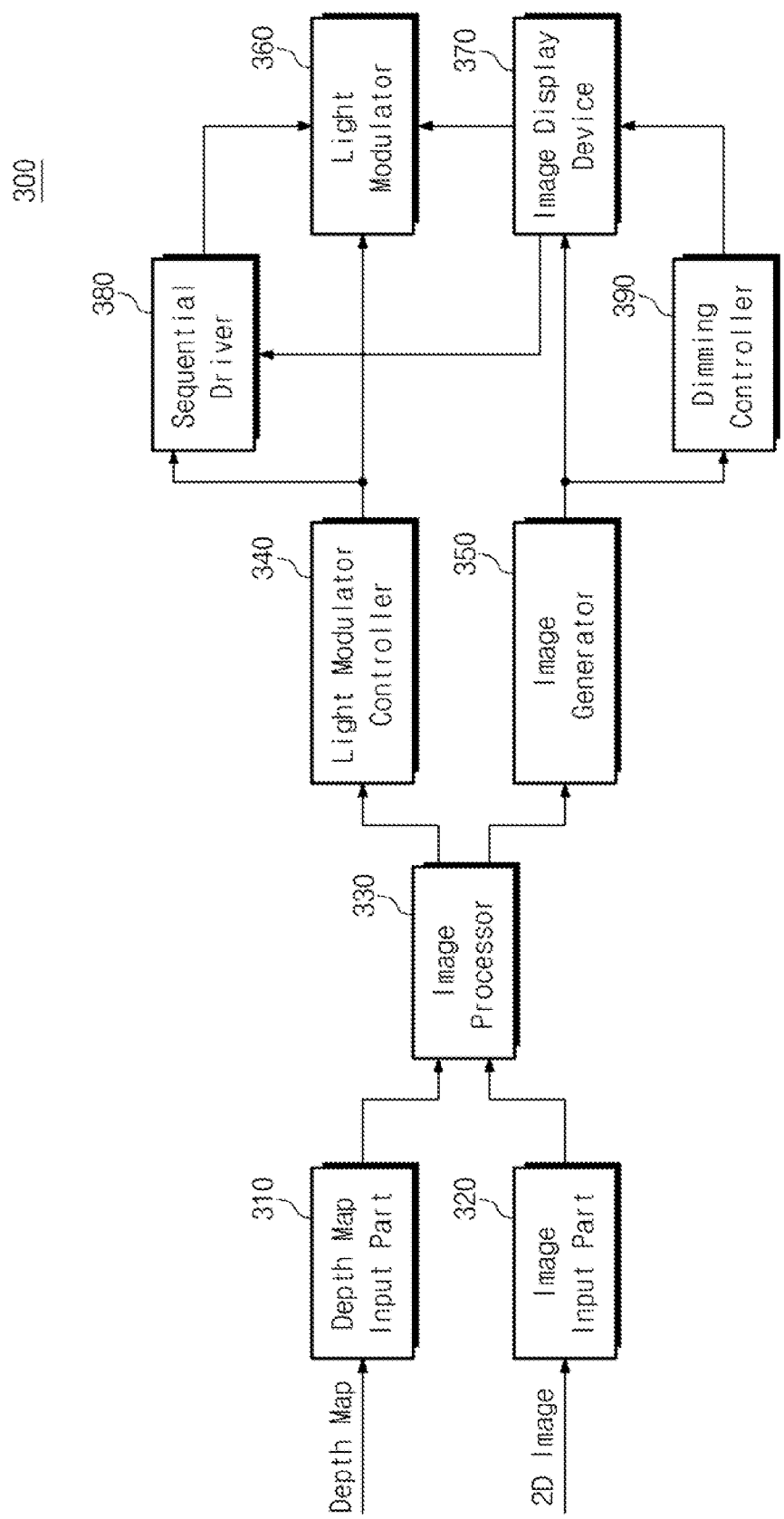
FIG. 8 is a block diagram showing a 3D image display apparatus according to an exemplary embodiment of the present invention.

FIG. 8 is a block diagram showing a 3D image display apparatus according to another exemplary embodiment of the present invention.

Referring to FIG. 8, a 3D image display apparatus 300 includes a depth map input part 310, an image input part 320, an image processor 330, a light modulator controller 340, an image generator 350, a light modulator 360, an image display device 370, a sequential driver 380, and a dimming controller 390. The 3D image display apparatus 300 has the same structure and function as that of the 3D image display apparatus 100 shown in FIG. 1, except the depth map input part 310, the image input part 320, and the image processor 330.

The depth map input part 310 receives a depth map and provides the depth map to the image processor 330. The image input part 320 receives a 2D image and provides the 2D image to the image processor 330.

The image processor 330 generates a left 2D image and a right 2D image using the depth map and the 2D image, and provides the left 2D image and the right 2D image to the image generator 350.

In addition, the image processor 330 generates the 3D image display position information using the depth map. In more detail, the image processor 330 generates the 3D image display position information corresponding to an area shown the white in the depth map. The area shown by black in the depth map does not need to be displayed in 3D. The 3D image display position information includes position information for the area of the light modulator 360 which corresponds to the area in which the 3D image is displayed. The generated 3D image display position information is provided to the light modulator controller 340 and the image generator 350. The other elements in the 3D image display apparatus 300 have the same structure and function as those of the 3D image display apparatus 100 shown in FIG. 1, and thus detailed descriptions of the same elements will be omitted.

Consequently, the 3D image display apparatus 100 generates the parallax barrier and the interlaced image only in the area in which the 3D image is displayed. Thus, the area for the parallax barrier is reduced and the size of left and right images of the interlaced image is reduced as compared to when the parallax barrier and the interlaced image are formed over the whole display screen. As described above, since the area for the parallax barrier is reduced, the brightness of the display is reduced less than when the parallax barrier is formed over the whole display screen. In other words, the brightness of the display is enhanced, since the area of the parallax barrier is reduced. In addition, since the surface area of the parallax barrier and the size of the left and right images of the interlaced image are reduced, power consumption of the 3D image display apparatus 100 is reduced and signal processing for the 3D image display apparatus 100 is simplified.

Figure 9A:
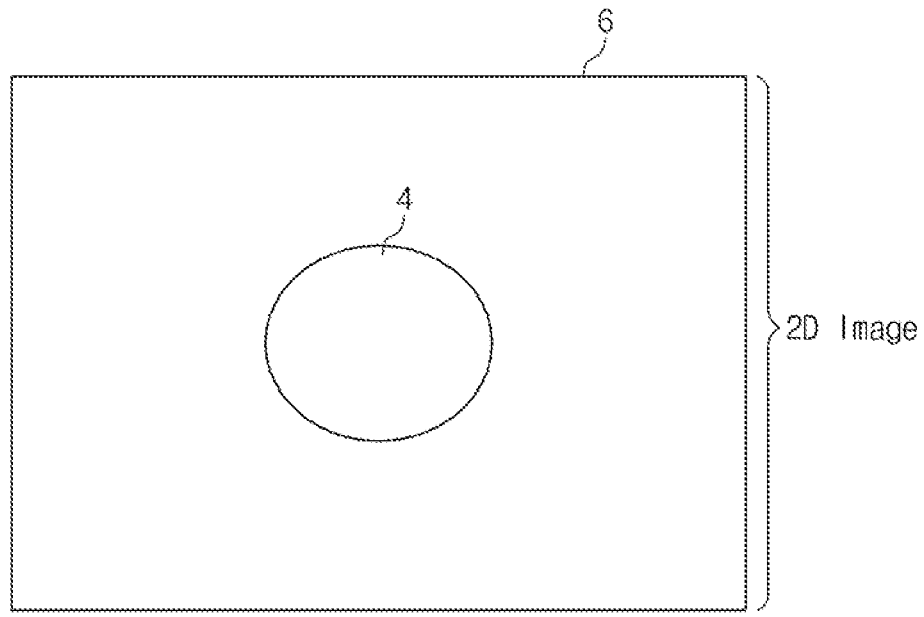
FIG. 9A is a view showing a 2D image input to the 3D image display apparatus shown in FIG. 8.

FIG. 9A is a view showing a 2D image input to the 3D image display apparatus shown in FIG. 8.

Referring to FIG. 9A, the 2D image input to the 3D image display apparatus includes a background image 6 and a circular image 4 to be displayed as a 3D image.

Figure 9B:
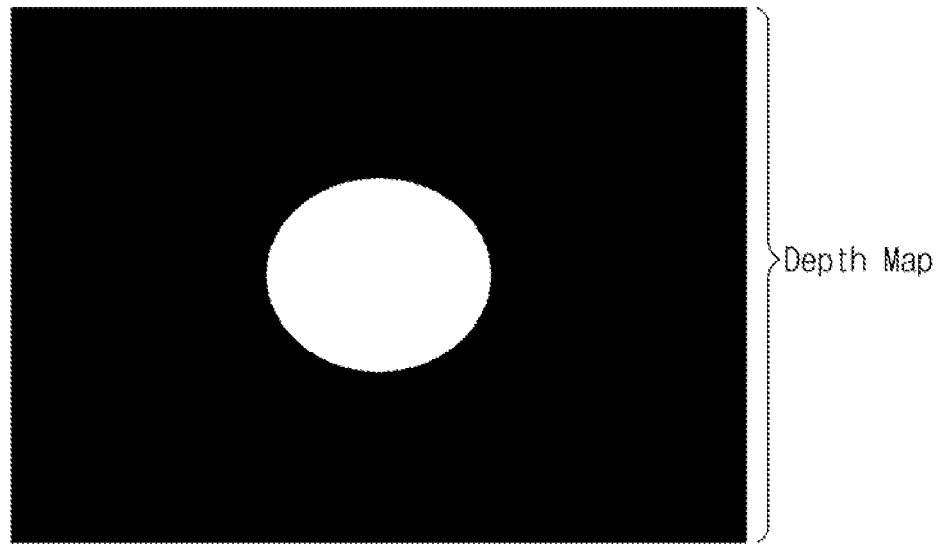
FIG. 9B is a view showing a depth map of the 2D image shown in FIG. 9A.

FIG. 9B is a view showing a depth map of the 2D image shown in FIG. 9A.

Referring to FIG. 9B, the circular image 4, which is to be displayed in 3D, is represented by a white color in the 2D depth map shown in FIG. 9A. The background image 6, which is not to be displayed in 3D, is represented by a black color. As described above, the image processor 330 generates the 3D image display position information corresponding to the area of the circular image 4, which is represented by the white color in the depth map.

Figure 9C:
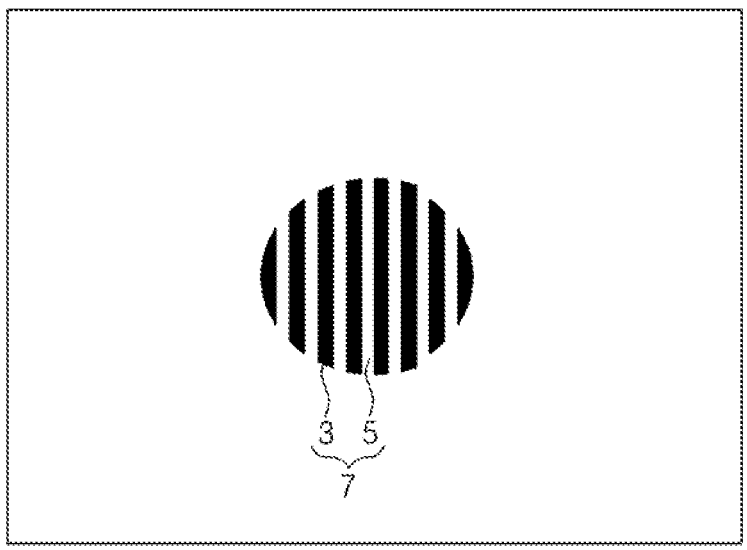
FIG. 9C is a view showing a parallax barrier generated in the 3D image display apparatus shown in FIG. 8 using the depth map shown in FIG. 9B.

FIG. 9C is a view showing a parallax barrier generated in the 3D image display apparatus shown in FIG. 8 using the depth map shown in FIG. 9B.

Referring to FIG. 9C, the parallax barrier is generated in the area of the light modulator 360 corresponding to the area of the circular image represented by the white color in the depth map. Although not shown in the figures, an interlaced image is generated in the area of the circular image represented by the white color in the depth map.

Figure 10:
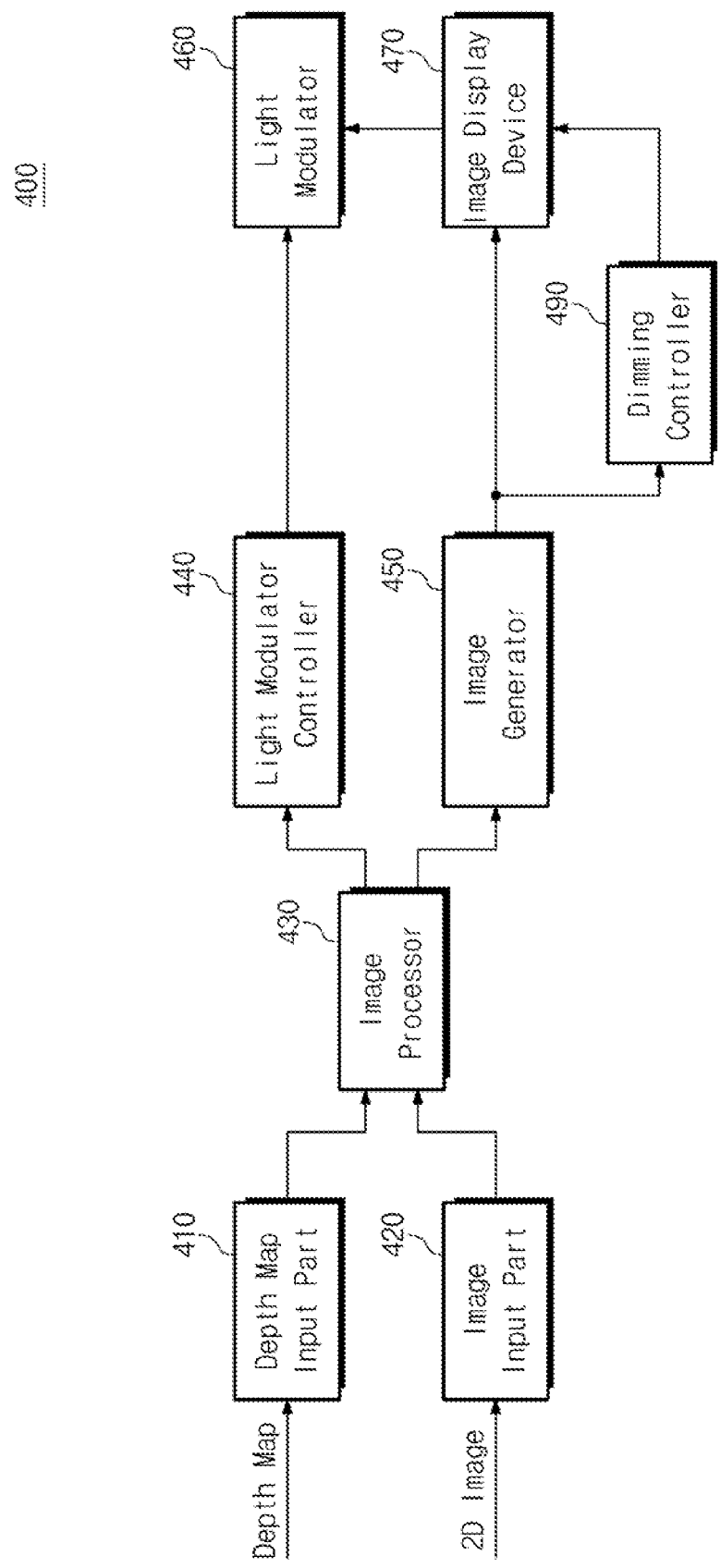
FIG. 10 is a block diagram showing a 3D image display apparatus according to an exemplary embodiment of the present invention.

FIG. 10 is a block diagram showing a 3D image display apparatus 400 according to an exemplary embodiment of the present invention.

The 3D image display apparatus 400 includes a light modulator 460 configured to include one of the active lenticular lens array or the polarization active lens array, and the 3D image display apparatus 400 has the same structure and function as that of the 3D image display apparatus 300 shown in FIG. 8, except that the 3D image display apparatus 400 does not include the sequential driver shown in FIG. 8. In addition, the operation of the 3D image display apparatus 400 is the same as the operation of the 3D image display apparatus 200 shown in FIG. 5.

Referring to FIG. 10, the depth map input part 410 receives a depth map and provides the depth map to the image processor 430. The image input part 420 receives a 2D image and provides the 2D image to the image processor 430.

The image processor 430 generates a left 2D image and a right 2D image using the depth map and the 2D image, and provides the left 2D image and the right 2D image to the image generator 450.

In addition, the image processor 430 generates the 3D image display position information using the depth map. In more detail, the image processor 430 generates the 3D image display position information corresponding to an area shown the white in the depth map. The area shown by black in the depth map does not need to be displayed in 3D. The 3D image display position information includes position information for the area of the light modulator 460 which corresponds to the area in which the 3D image is displayed. The generated 3D image display position information is provided to the light modulator controller 440 and the image generator 450. The other elements in the 3D image display apparatus 400 have the same structure and function as those of the 3D image display apparatus 200 shown in FIG. 5, and thus detailed descriptions of the same elements will be omitted. For example, image display device 470 and dimming controller 490 correspond to image display device 270 and dimming controller 290 respectively, and function similarly.

Consequently, the 3D image display apparatus 400 drives only the lens area corresponding to the area in which the 3D image is displayed, and thus the power consumption of the 3D image display apparatus 400 is reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A three dimensional (3D) image display apparatus comprising:
a light modulator configured to modulate an image light;
a difference map generator for receiving a variation value of a left two dimensional (2D) image and a variation value of a right 2D image, and determining an absolute value of a difference between the variation value of the left 2D image and the variation value of the right 2D image;

an image processor configured to generate 3D image display position information using the absolute value, and to receive the left and right 2D images from the difference map generator;

a light modulator controller that partially activates the light modulator in response to the 3D image display position information provided from the image processor, so as to activate an activated area of the light modulator for display of an image according to the 3D image display position information;

an image generator configured to generate an interlaced image using the left and right 2D images and based on the 3D image display position information provided from the image processor; and an image display device configured to display an image including the interlaced image and a 2D image, wherein the activated area of the light modulator corresponds only to a spatial area of the displayed interlaced image and not to a spatial area of the 2D image, so that the light modulator modulates light provided from the displayed interlaced image, and does not modulate light provided from the 2D image image.

2. The 3D image display apparatus of claim 1, wherein the light modulator comprises:
a first substrate;
a second substrate facing the first substrate; and
a liquid crystal layer disposed between the first substrate and the second substrate.

3. The 3D image display apparatus of claim 2:
wherein the first substrate comprises:
    a first base substrate; and
    a plurality of first transparent electrodes disposed on the first base substrate, spaced apart from each other, and extending substantially in a first direction, and
wherein the second substrate comprises:
    a second base substrate; and
    a plurality of second transparent electrodes disposed on the second base substrate, spaced apart from each other, and extending substantially in a second direction that is perpendicular to the first direction.

4. The 3D image display apparatus of claim 3, wherein the light modulator controller is configured to apply a voltage to those first transparent electrodes and those second transparent electrodes which correspond to the activated area.

5. The 3D image display apparatus of claim 1, wherein the light modulator controller is further configured to generate a parallax barrier in the activated area of the light modulator.

6. The 3D image display apparatus of claim 5, wherein the parallax barrier comprises a plurality of masks and a plurality of slits disposed between the masks.

7. The 3D image display apparatus of claim 6, wherein the interlaced image comprises left and right images for display on the image display device, and the slits of the parallax barrier are configured for positioning so as to direct the left and right images to positions corresponding to left and right eyes of an observer, respectively.

8. The 3D image display apparatus of claim 6, further comprising a sequential driver, wherein the sequential driver is configured to control the light modulator in response to the 3D image display position information and a scanning of the image display device such that positions of the masks are switched with positions of the slits.

9. The 3D image display apparatus of claim 1, wherein the image generator is configured to generate the 2D images using the left and right 2D images, the 2D images for display in areas of the image outside the area in which the interlaced image is displayed.

10. The 3D image display apparatus of claim 9, further comprising a dimming controller, wherein the image display device comprises a plurality of blocks, and wherein the dimming controller is configured to control, from the interlaced image and the 2D images, an amount of light emitted from each of the blocks.

11. The 3D image display apparatus of claim 1, wherein the image processor is further configured to generate the 3D image display position information in response to the absolute value being equal to or greater than a predetermined reference value.

12. The 3D image display apparatus of claim 11, wherein the reference value is greater than or smaller than zero.

13. The 3D image display apparatus of claim 1, wherein the light modulator comprises:
a first substrate;
a second substrate facing the first substrate; and
a micro-lens array disposed between the first substrate and the second substrate, wherein the micro-lens array comprises:
    a substantially transparent frame disposed on the first substrate and comprising a polyimide, the transparent frame having a micro-lens shape at least partially filled with a liquid crystal; and
    a material disposed on the transparent frame and having a refractive index substantially the same as a refractive index of the liquid crystal when a power supply voltage is not applied to the liquid crystal.

14. The 3D image display apparatus of claim 13, wherein each of the first and second substrates comprises a plurality of transparent electrodes, the transparent electrodes of the first substrate being spaced apart from each other and extending substantially in the first direction, and the transparent electrodes of the second substrate are spaced apart from each other and extend substantially in the second direction.

15. The 3D image display apparatus of claim 1, wherein the light modulator comprises:
a birefringence micro-lens array;
a lens substrate disposed on the birefringence micro-lens array; and
an electric polarization switch disposed on the lens substrate,
wherein the birefringence micro-lens array comprises:
    a liquid crystal lens; and
    an isotropic polarization film disposed on the liquid crystal lens, and
wherein the electric polarization switch comprises:
    a first substrate;
    a second substrate facing the first substrate; and
    a twisted nematic mode liquid crystal disposed between the first substrate and the second substrate.

16. The 3D image display apparatus of claim 15, wherein each of the first and second substrates comprises a plurality of transparent electrodes, the transparent electrodes of the first substrate being spaced apart from each other and extending substantially in the first direction, and the transparent electrodes of the second substrate are spaced apart from each other and extend substantially in the second direction.

17. The 3D image display apparatus of claim 9, wherein the image generator is programmed to output one image from among the left and right 2D images as the 2D image, responsive to a difference between the variation values of the left and right 2D images being zero.

* * * * *